US012549427B2

(12) United States Patent
Koskinen et al.

(10) Patent No.: US 12,549,427 B2
(45) Date of Patent: Feb. 10, 2026

(54) DEVICE MANAGEMENT FOR HYBRID ELEVATOR ENVIRONMENTS

(71) Applicant: KONE Corporation, Helsinki (FI)

(72) Inventors: Santtu Koskinen, Helsinki (FI); Mikko Piironen, Helsinki (FI); Anssi Rantamäki, Helsinki (FI); Mikko Heiskanen, Helsinki (FI); Ari Koivisto, Helsinki (FI); Mikko Mattila, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1282 days.

(21) Appl. No.: 17/205,572

(22) Filed: Mar. 18, 2021

(65) Prior Publication Data
US 2021/0221642 A1  Jul. 22, 2021

Related U.S. Application Data

(63) Continuation of application No. PCT/EP2018/078149, filed on Oct. 16, 2018.

(51) Int. Cl.
H04L 41/0226 (2022.01)
B66B 1/34 (2006.01)

(52) U.S. Cl.
CPC ........ *H04L 41/0226* (2013.01); *B66B 1/3453* (2013.01)

(58) Field of Classification Search
CPC .......... H04L 41/0226; B66B 1/3453
See application file for complete search history.

(56) References Cited

U.S. PATENT DOCUMENTS

| | | |
|---|---|---|
| 6,216,172 B1 | 4/2001 | Kölblin et al. |
| 8,891,423 B2 | 11/2014 | Shaheen et al. |
| 9,537,808 B1 | 1/2017 | Giansiracusa et al. |
| 2009/0022131 A1 | 1/2009 | Rusanen et al. |
| 2012/0066356 A1 | 3/2012 | Nguyen et al. |

(Continued)

FOREIGN PATENT DOCUMENTS

| | | | | |
|---|---|---|---|---|
| CN | 101228768 A | * | 7/2008 | .......... H04L 65/1101 |
| CN | 103036732 A | * | 4/2013 | |

(Continued)

OTHER PUBLICATIONS

CN-103036732-A translation (Year: 2013).*

(Continued)

*Primary Examiner* — Henry Tsai
*Assistant Examiner* — John B Roche
(74) *Attorney, Agent, or Firm* — Birch, Stewart, Kolasch & Birch, LLP

(57) ABSTRACT

To have an integrated device management for a hybrid elevator environment, at least one converter for converting device management messages according to a second protocol used by one or more peripheral devices to be according to a first protocol, which is used by the device management of the elevator environment, is added to the elevator environment. Further, the device management is configured to update, in response to receiving a device management message containing, as device information, at least an identifier of a peripheral device, network information to contain the device information in the device management message.

20 Claims, 3 Drawing Sheets

(56) References Cited

U.S. PATENT DOCUMENTS

| | | |
|---|---|---|
| 2012/0145487 A1 | 6/2012 | Yoo |
| 2014/0045479 A1 | 2/2014 | Shinada et al. |
| 2016/0337181 A1 | 11/2016 | Cathrow et al. |
| 2018/0099840 A1 | 4/2018 | Armistead |

FOREIGN PATENT DOCUMENTS

| | | | | |
|---|---|---|---|---|
| CN | 103647782 B | 2/2017 | | |
| EP | 2 258 649 A1 | 12/2010 | | |
| EP | 2587725 A1 * | 5/2013 | ........... | H04L 67/125 |
| EP | 3 062 541 A1 | 8/2016 | | |
| EP | 3 318 523 A1 | 5/2018 | | |
| EP | 3 381 851 A2 | 10/2018 | | |
| EP | 3 381 852 A2 | 10/2018 | | |
| WO | WO 2007/061405 A2 | 5/2007 | | |
| WO | WO 2007/093665 A1 | 8/2007 | | |
| WO | WO 2010/087815 A1 | 8/2010 | | |
| WO | WO 2012/118711 A2 | 9/2012 | | |
| WO | WO 2014/122357 A1 | 8/2014 | | |
| WO | WO 2015/084396 A1 | 6/2015 | | |
| WO | WO 2015/177020 A1 | 11/2015 | | |
| WO | WO 2018/050654 A1 | 3/2018 | | |

OTHER PUBLICATIONS

CN-101228768-A translation (Year: 2008).*
Cisco, "Connected Rail Solution Design Guide," URL: https://www.cisco.com/c/dam/en_us/solutions/industries/docs/cts-dg.pdf, Nov. 2016, XP055613499, 42 pages total.
Cisco, "Understanding CHAP authentication," URL: https://www.cisco.com/c/en/us/support/docs/wan/point-to-point-protocol-ppp/25647-understanding-ppp-chap.pdf, Oct. 21, 2015, XP055600402, 10 pages total.
International Search Report for International Application No. PCT/EP2018/078149, dated Mar. 28, 2019.
International Search Report for International Application No. PCT/FI2018/050742, dated Jul. 18, 2019.
International Search Report for International Application No. PCT/FI2018/050743, dated Jul. 5, 2019.
International Search Report for International Application No. PCT/FI2018/050744, dated Sep. 4, 2019.
International Search Report for International Application No. PCT/FI2018/050745, dated Jul. 8, 2019.
International Search Report for International Application No. PCT/FI2018/050746, dated Sep. 24, 2019.
International Search Report for International Application No. PCT/FI2018/050747, dated Jul. 8, 2019.
International Search Report for International Application No. PCT/FI2018/050748, dated Jul. 5, 2019.
Written Opinion of the International Searching Authority for International Application No. PCT/EP2018/078149, dated Mar. 28, 2019.
Written Opinion of the International Searching Authority for International Application No. PCT/FI2018/050742, dated Jul. 18, 2019.
Written Opinion of the International Searching Authority for International Application No. PCT/FI2018/050743, dated Jul. 5, 2019.
Written Opinion of the International Searching Authority for International Application No. PCT/FI2018/050744, dated Sep. 4, 2019.
Written Opinion of the International Searching Authority for International Application No. PCT/FI2018/050745, dated Jul. 8, 2019.
Written Opinion of the International Searching Authority for International Application No. PCT/FI2018/050746, dated Sep. 24, 2019.
Written Opinion of the International Searching Authority for International Application No. PCT/FI2018/050747, dated Jul. 8, 2019.
Written Opinion of the International Searching Authority for International Application No. PCT/FI2018/050748, dated Jul. 5, 2019.

* cited by examiner

DEVICE MANAGEMENT FOR HYBRID ELEVATOR ENVIRONMENTS

CROSS REFERENCE TO RELATED APPLICATIONS

This application is a Continuation of PCT International Application No. PCT/EP2018/078149 filed on Oct. 16, 2018, which is hereby expressly incorporated by reference into the present application.

FIELD

The present invention relates to device management for hybrid elevator environments, and more precisely to an elevator system for a hybrid elevator signalling network, the system comprising device management equipment.

BACKGROUND

Traditionally, an elevator environment comprised proprietary devices of the manufacturer of elevators used in the elevator environment. Such devices use the same, usually proprietor-specific, network management protocol for signalling to a device management. However, elevator environments are evolving to hybrid environments, in which devices are from different manufacturers, including different off the shelf devices. Such devices may use different network management protocol(s) than the proprietary devices and/or different device management tool(s), not interoperable with the device management for the propriety devices. That results to an elevator environment with separate device managements, or devices not under any kind of device management, thereby making the device management of a hybrid elevator signalling network difficult.

BRIEF DESCRIPTION

According to an aspect, there is provided the subject matter of the independent claims. Some embodiments are defined in the dependent claims.

An aspect provides an elevator system for a hybrid elevator network, the system comprising: one or more devices forming a first subnetwork of the hybrid elevator network; a data storage comprising, as network information, pre-set information on the one or more devices forming the first subnetwork; device management equipment for elevator device management, the device management equipment being configured to use for device management messages at least one or more first protocols and to update and retrieve information from the data storage; one or more second subnetworks of the hybrid elevator network, a second subnetwork comprising one or more peripheral devices, a peripheral device in a second subnetwork being configured to use a second protocol for device management messages; at least one converter for converting device management messages according to the second protocol to be according to a first protocol before the device management messages reach the device management equipment; wherein the device management equipment is configured to update, in response to receiving a device management message containing, as device information, at least an identifier of a peripheral device, the network information in the data storage to contain the device information in the device management message.

In a further aspect of the elevator system, at least one of the one or more second subnetworks comprises one or more switches, a switch having a connection to the device management equipment and to which switch peripheral devices are connectable, wherein the switch is configured to send, in response to a peripheral device connecting to the switch or disconnecting from the switch, a device management message according to one of the one or more first protocols, the device management message comprising, as device information, identifiers of each peripheral device connected to the switch.

In another further aspect of the elevator system, the one of the one or more first protocols is the Simple Network Management Protocol.

In a still further aspect of the elevator system, a peripheral device is configured to register itself to the device management equipment by sending, as device information, at least its identifier in a device management message created according to the second protocol.

In another further aspect of the elevator system, the peripheral device further comprises the converter and is configured to convert the device management message to be in accordance with at least one of the one or more first protocols before sending the device management message.

In a still further aspect of the elevator system, the converter is a network entity between the network management equipment and the peripheral device and is configured to convert the device management message to be in accordance with at least one of the one or more first protocols.

In a further aspect of the elevator system, the at least one of the one or more first protocols includes the Simple Network Management Protocol, the Message Queuing Telemetry Transport protocol, the Hypertext Transfer Protocol and/or the Hypertext Transfer Protocol Secure.

In yet a further aspect of the elevator system, the peripheral device is a multipurpose display or a destination operation panel.

In still a further aspect of the elevator system, the second protocol is a device-specific protocol.

In another further aspect of the elevator system, the device management equipment is configured to use the network information in the data storage to form one or more topology views illustrating at least part of the elevator network, which part include at least part of the one or more second subnetworks, created using at least identifiers of peripheral devices; and the elevator system further comprises one or more user interfaces to display the one or more topology views.

In a further aspect of the elevator system, the identifier is a medium access control address of the peripheral device, or an IP address of the peripheral device.

In another further aspect of the elevator system, the device management equipment is further configured to create device management messages according to the first protocol to be transmitted to one or more target devices in a second subnetwork; and the at least one converter is configured to convert a management message according to the first protocol to be according to a second protocol used by a target device.

In a still further aspect of the elevator system, the converter is a device management agent dedicated for the peripheral device or a device management agent dedicated for a second subnetwork or a device management agent for the one or more second subnetworks.

Another aspect provides a method for a hybrid elevator network, the method comprising: maintaining in a data storage, as network information, pre-set information on one or more devices in the hybrid elevator network; using, by elevator device management, for device management messages at least one or more first protocols; using, by one or more peripheral devices in the hybrid network, one or more second protocols for device management messages; converting device management messages according to the second protocol to be according to a first protocol before the device management messages reach the elevator device management; and updating, in response to receiving a device management message containing, as device information, at least an identifier of a peripheral device, the network information to contain the device information in the device management message.

In a further aspect, the method further comprises: creating, by a switch in the hybrid elevator network, in response to a peripheral device connecting to the switch or disconnecting from the switch, a device management message according to one of the one or more first protocols, the device management message comprising, as device information, identifiers of each peripheral device connected to the switch; and sending the device management message to the elevator device management.

In a still further aspect of the elevator system, the method further comprises: creating, by a peripheral device, a device management message according to the second protocol, the device management message comprising, as device information, an identifier of the peripheral device; and sending the device management message towards the elevator device management.

In a yet further aspect, the method further comprises: creating, by the elevator device management, based on at least identifiers of peripheral devices in the network information in the data storage, one or more topology views illustrating at least part of the elevator network, which part includes at least one peripheral device; and displaying the one or more topology views.

In another further aspect, the method further comprises: creating, by the elevator device management, device management messages according to the first protocol to be transmitted to one or more target peripheral devices; and converting each management message according to the first protocol to be according to a second protocol used by one or more target peripheral device.

One or more examples of implementations are set forth in more detail in the accompanying drawings and the description below. Other features will be apparent from the description and drawings, and from the claims.

BRIEF DESCRIPTION OF DRAWINGS

In the following, example embodiments will be described in greater detail with reference to the attached drawings, in which FIG. 1 illustrate exemplified hybrid elevator network.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples. Manners of device management (network management) and implementing data storages develop constantly. Consequently, all terms and expressions should be interpreted broadly, and they are intended to describe, not to restrict, the invention.

Figure 1:
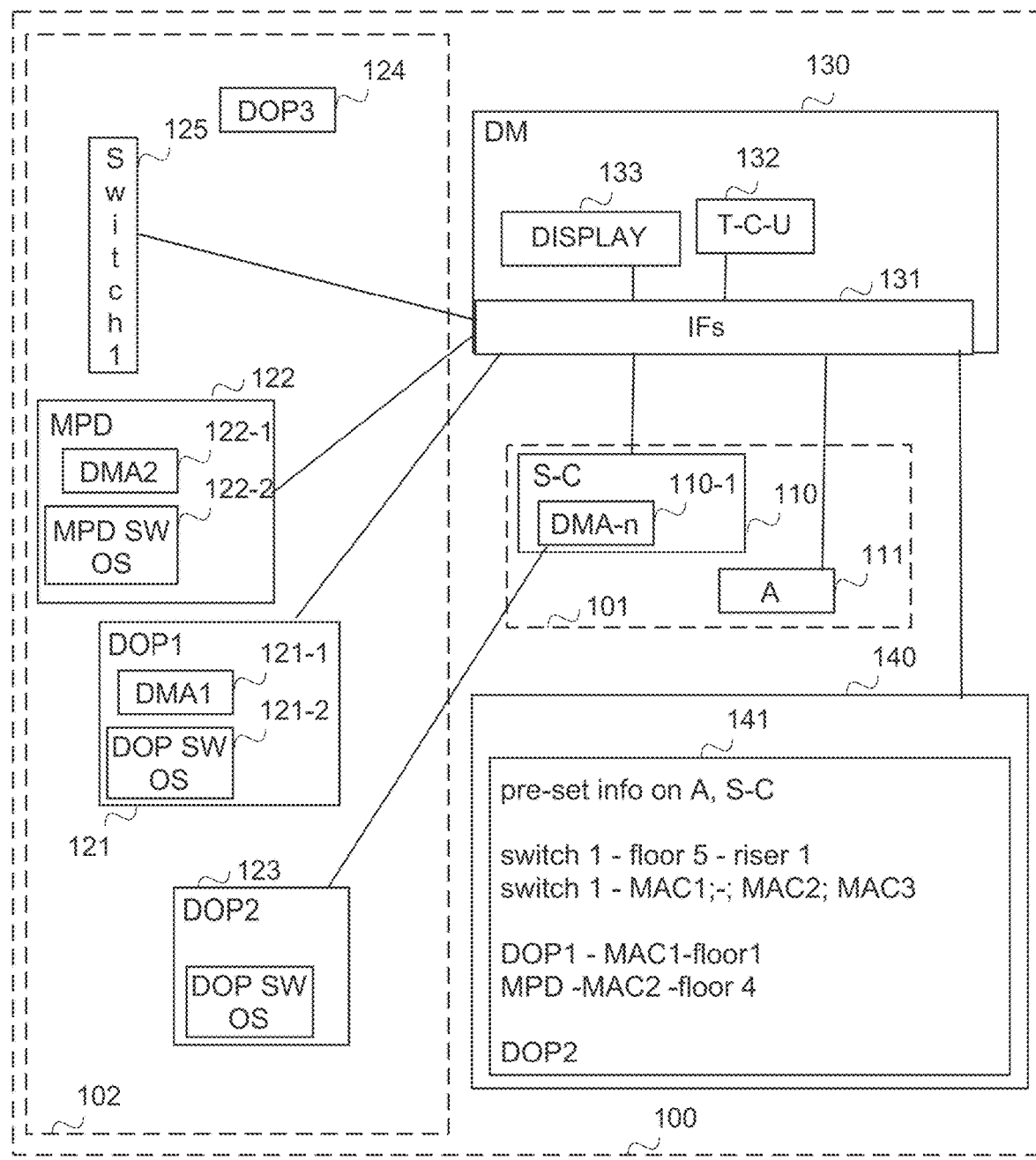

FIG. 1 illustrates a simplified elevator system describing only some devices with their logical connections to device management equipment. The illustrated elevator system depicts versatile possibilities available for different implementations. Actual realizations may use fewer possibilities and their implementation may deviate from what is presented. The general devices, elements and functions of elevator systems, details of which also depend on the actual type of an elevator system, are known to those skilled in the art, so that a detailed description thereof is omitted herein. Concepts called cloud computing and/or virtualization may be used as well. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing, network devices (devices belonging to a network), computing devices and/or storage devices provide shared resources. Some other technology advancements, such as Software-Defined Networking (SDN), may cause one or more of the functionalities described below to be migrated to any corresponding abstraction or apparatus or device. Therefore, as said above, all words and expressions should be interpreted broadly, and they are intended to illustrate, not to restrict, the embodiment.

In the example of FIG. 1, the elevator system 100 comprises two subnetworks 101, 102 of a hybrid elevator signalling network, device management equipment 130 for the hybrid elevator signalling network and a data storage 140 for the device management equipment. It is obvious to a person skilled in the art that the elevator system comprises other devices, elements, functions and structures, such as operation elements, control elements, sensors, elevator cars, etc. However, as said above, the more detailed structure of the elevator system is irrelevant to the actual invention, and therefore not described herein.

In the illustrated example, a first subnetwork 101 represents a signalling network using a first protocol for device management messages (device management signalling), below called shortly "messages". The first subnetwork 101 may be a network resembling a traditional elevator environment with devices 110, 111, device information of which is pre-set (preconfigured) to the data storage. The first protocol may be based on proprietor-specific protocol, which may be a non-IP (Internet Protocol) based protocol. However, the first protocol may be based on IP-protocol as well, and/or it may be a non-proprietor protocol.

In the example of FIG. 1, to support an integrated device management, one of the illustrated devices in the first subnetwork comprises a converter DMA-n 110-1 for providing centralized conversions from one type of a second protocol to the first protocol, and possible vice versa. Although only one converter is depicted, there may be two or more corresponding centralized type of converters. The converter 110-1 for centralized conversions may be for a specific second subnetwork, for example for a second subnetwork (or sub-networks) in which the peripheral devices use the same second protocol. The converter 110-1 may be dedicated to specific type of peripheral devices, for example for multipurpose panels (using the same second protocol). The second protocol may as well be based on IP-protocol, or non-IP based protocol, and it may be a proprietary protocol or non-proprietary protocol. The device 110 comprising the converter 110-1 may be a site controller (S-C), for example. Further, it should be appreciated that a centralized converter may locate in a network entity in a second subnetwork, or between a first subnetwork and a second subnetwork. (A network entity is a manageable logical entity that may locate in a physical device or unite one or more physical devices so that they are seen as one entity.)

In the illustrated example, a second subnetwork 102 comprises different peripheral devices 121, 122, 123, 124, and a switch 125. It should be appreciated that instead of having one second subnetwork 102, the second subnetwork may be logically divided into several second subnetworks in which case a peripheral device, or a switch, may logically belong to several second subnetworks.

The peripheral devices in the illustrated example include destination operation panels 121, 123, 124 (DOP1, DOP2, DOP3), a multipurpose panel 122 (MPD) and a switch 125 (Switch 1). It should be appreciated that all of the illustrated peripheral devices are different from each other for illustration purposes only.

In the illustrated example, one 121 of the destination operation panels, DOP1, and the multipurpose panel 122, depict devices that are configured to support the integrated device management by adding to corresponding original devices 121-2, 122-2 corresponding device-specific converters 121-1, 122-1 (DMA1, DMA2). The device-specific converters may be different from each other, if the original devices are configured to use different second protocols for the device management.

Further, in the illustrated example, two 123, 124 of the destination operation panels, DOP2, DOP3, depict original devices, not specifically configured to support the integrated device management. However, they are not of the same type: one 123 of the original devices, DOP2 is configured to use such a second protocol for device management that the converter 110-1 in the first subnetwork can provide the integrated device management for it.

The switch 125 is a device that connects different peripheral devices to the device management equipment, for example, and allows transparent information exchange (message transmissions) between connected devices that can communicate with each other. The switch 125 may an unmanaged switch, but typically in an elevator environment the switch is a managed network switch, manageable by the device management equipment, for example.

The device management equipment 130 may comprise one or more computing devices (not shown separately in FIG. 1), with different interfaces (IFs) 131 towards other devices, and one or more displays 133 depicting user interfaces providing monitor and manipulation possibilities remotely and/or on the site. The device management equipment 130 is configured to run one or more applications to monitor and manage remote devices in an elevator environment, using device information (network information, also called inventory) in a data storage, as is known in the art. To support the integrated device management, the device management equipment comprises an enhanced topology creation unit (T-C-U) 132, whose functionality will be described with FIGS. 6 and 7.

The data storage 140 stores the device information 141, for example, as part of network information. Some of the device information (network information) may be pre-set information (i.e. information stored before actual installation), and some added/updated during the installation, for example, as will be described in more detail with FIGS. 2 to 4. The data storage 140 may be any kind of conventional or future data repository, including distributed and centralized storing of data, managed by any suitable management system forming part of the device management. An example of distributed storing includes a cloud-based storage in a cloud environment (which may be a public cloud, a community cloud, a private cloud, or a hybrid cloud, for example). Cloud storage services may be accessed through a co-located cloud computer service, a web service application programming interface (API) or by applications that utilize API, such as cloud desktop storage, a cloud storage gateway or Web-based content management systems. However, the implementation of the data storage, the manner how data is stored, retrieved and updated, and the location where the data are stored are irrelevant to the invention.

The device information 141 illustrated in FIG. 1 is based on an assumption that on site the peripheral devices 121, 122, 123, 124 are each connected over a wired connection to the switch 125, which in turn is connected over a wired connection to a site controller and via it to the device management equipment 130, and that a media access control address (MAC address) of a device is used at its identifier. A MAC address identifies a device uniquely, and it is used in Ethernet connections, IP based (Internet Protocol based) connections, and non-IP based connections utilising OSI layers. Naturally, any other identifier may be used. For example, an IP address of a device, a certificate of a device, a combination of device type and location information, etc. may be used as an identifier. The Ethernet connection used may be any type of Ethernet, such as a twisted-pair Ethernet, or a fibre optic Ethernet. Naturally any other wired connection may be used, or some, or all of the connections may be wireless ones, i.e. no wired connections exist. In other words, one or more, or all, of the peripheral devices 121, 122, 123, 124 may be connected over one or more wireless connections to the switch 125, and/or the switch 125 may be connected over one or more wireless connections to a site controller, or corresponding equipment. It should be appreciated that the device information 141 (network information) may also comprise other information, which is not shown.

Furthermore, in the illustrated example, the converters are device management agents (DMAs) that are part of device management on site (DMS) system, and they may be configured to convert messages according to any second protocol to messages according to the Message Queuing Telemetry Transport protocol (MQTT), the Hypertext Transfer protocol (HTTP), the Hypertext Transfer Protocol Secure (HTTPS) and/or the Simple Network Management Protocol (SNMP), or other protocol compatible with an elevator device management protocol, and vice versa. However, any type of a converter can be used, as long as it performs the required conversions.

As a summary, in the illustrated example of FIG. 1, there are three different kinds of peripheral devices in the second subnetwork: peripheral devices 121, 122 each provided with a converter, peripheral devices 123 (only one illustrated) using a protocol for which the network is configured to provide a converter 110-1, and peripheral devices (only one illustrated) 124 having no converter. It should be appreciated that the subnetwork(s) in the elevator environment may comprise only peripheral devices provided with a converter, or peripheral devices and one or more converters in the network, or anything between those solutions and the example of FIG. 1.

Figure 2:
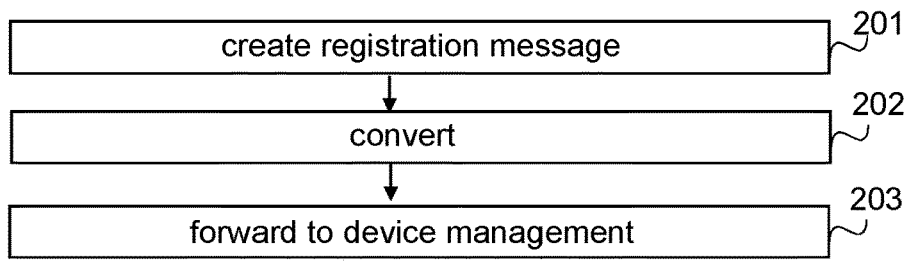
FIGS. 2 to 4 illustrate exemplified processes.

FIG. 2 is a flow chart illustrating a functionality when a peripheral device is installed (added or connected) to the elevator signalling network. When the peripheral device is connected, its registration is triggered. Triggering of the registration causes that the peripheral device creates in step 201 a registration message, which contains at least an identifier of the peripheral device, such as the MAC address. The registration message may contain also some other information inputted to the device either before installation, or on the site during installation. Examples of such information include, for example, the floor on which the peripheral device is installed. The message is created to be in accordance of the protocol (term "second protocol" used herein) the peripheral device is configured to use for network management signalling. Then the message is converted in step 202 to be accordance of the protocol (first protocol) that is used by the device management equipment for the network management signalling. Depending on implementation/embodiment, the conversion may be performed at the peripheral device, or at some entity in the elevator signalling network. Then the converted message is forwarded in step 203 to the device management entity to be processed.

Figure 3:
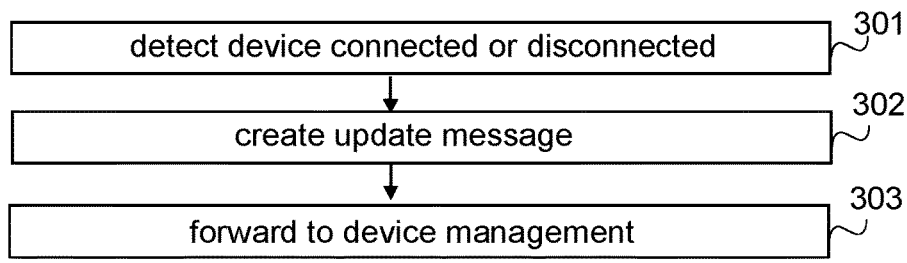

FIG. 3 is a flow chart illustrating a functionality in a switch, already installed to the elevator signalling network. Referring to FIG. 3, each time the switch detects in step 301 that a peripheral device is connected to a port of the switch or disconnected from a port of the switch, the switch creates in step 302 an update message, or any corresponding message, that lists, port by port, identifiers of those devices that are connected to the switch. For example, if Ethernet cables are used to connect peripheral devices to the switch, the switch can determine MAC addresses of connected devices, as is known by one skilled in the art. The update message may be according to SNMP (Simple Network Management Protocol). However, any other protocol may be used as well. Once the update message has been created, it is forwarded in step 303 to the device management equipment (device management entity) to be processed.

Figure 4:
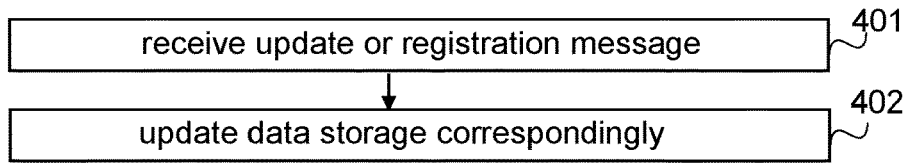
Figure 5:
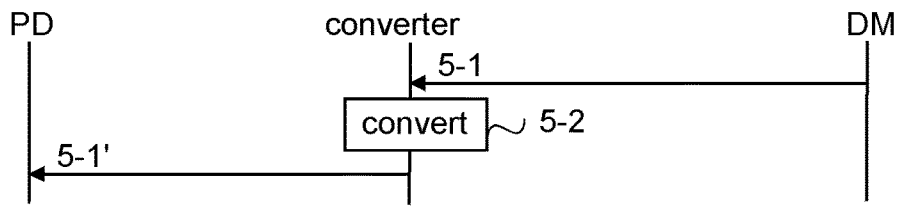
FIG. 5 illustrates an example of information exchange.

FIG. 4 illustrates the functionality of the device management equipment when it maintains the device information (network information) comprising the device information in the database. Referring to FIG. 4, when the device management equipment receives in step 401 an update message from a switch or a registration message from a peripheral device, it updates in step 402 the device data in the data storage correspondingly.

Usually the network management signalling network is a full duplex or a semi-duplex network, comprising bi-directional interfaces that allow message flows to the device management equipment from the peripheral devices, and from the device management equipment to the peripheral devices.

When the device management equipment DM sends a management message 5-1 to a peripheral device PD, the management message passes through a converter, which converts in point 5-2 the management message to be in accordance with a protocol used by the peripheral device for management messages. In other words, the converter converts the message 5-1 that is according to the first protocol to be according to a second protocol. After conversion, the thus obtained message 5-1' is forwarded to the peripheral device. As said above, the converter may locate in the peripheral device, or in the elevator network. Thanks to that the device management equipment may remote control, configure and/or manipulate the peripheral devices. For example, the device management equipment may send software updates, instructions to configure/reconfigure, commands to boot, etc. to one or more peripheral devices.

Figure 6:
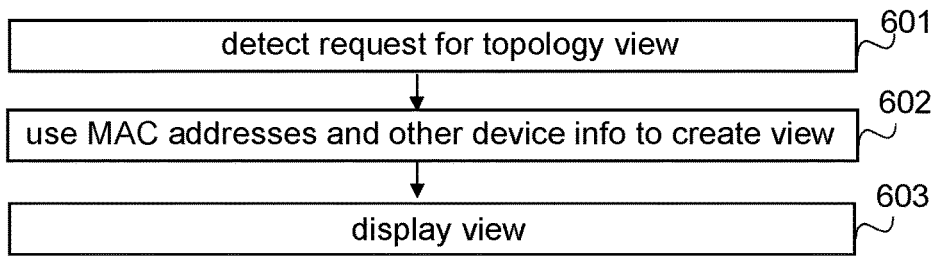
FIG. 6 illustrate an exemplified process.

FIG. 6 illustrates a functionality of the device management equipment, or more precisely the topological creation unit. In response to receiving in step 601 as a user input, for example, a request for a topology view of the elevator system, or part of the elevator system, the identifiers, i.e. MAC addresses, and other device information stored to the database is used in step 602 to create the view. When the view is created, or even while it is being created, it is displayed in step 603 on a user interface. This facilitates creation of different views.

Figure 7:
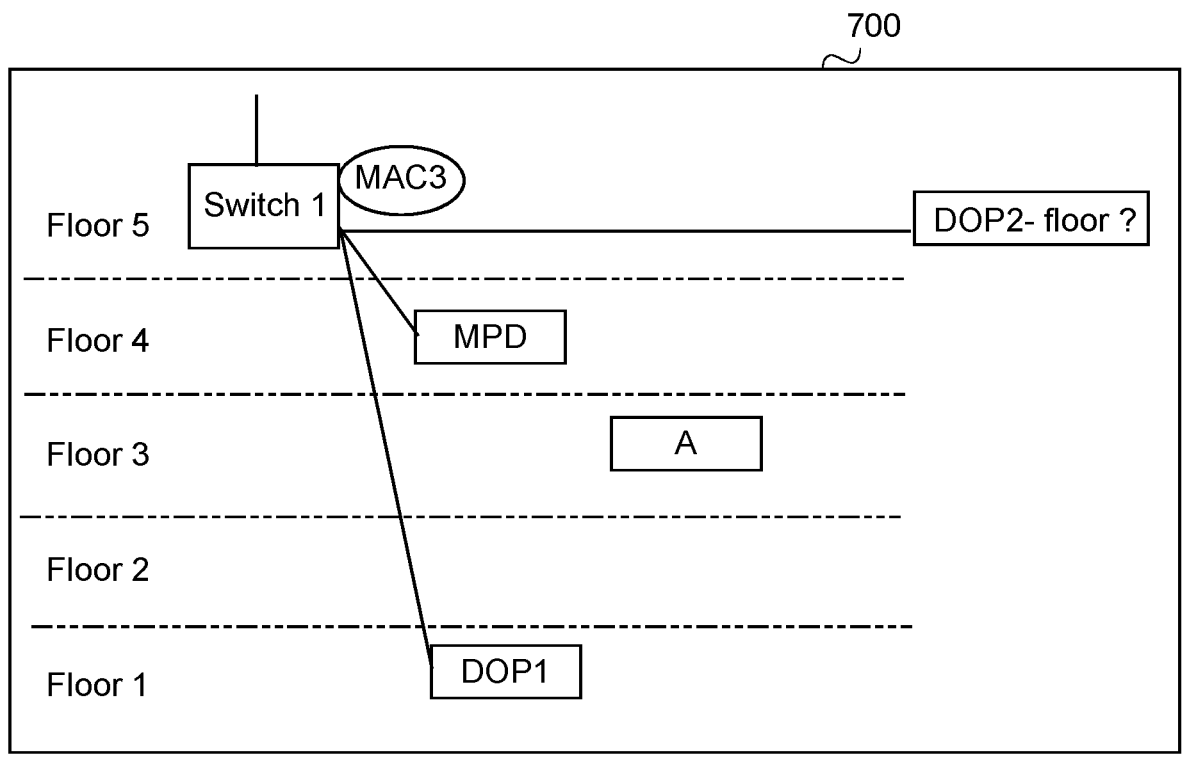
FIG. 7 illustrate an example of a view.

FIG. 7 illustrates an example of such a view, created using the information depicted in FIG. 1 for a specific part, which is a riser (riser 1). In the example it is assumed that device A is a sensor, for example, that is installed on an elevator shaft, and associated in the pre-set information with the riser 1 on the floor 3.

Referring to FIG. 7, the view 700 shows that the switch 1 locates on the floor 5, and devices connected to the switch 1 are DOP1 on the floor 1, found based on MAC1, MPD on the floor 4, found based on MAC2, DOP2, found based on MAC2, without floor information. Further, the view 700 indicates that there is a further peripheral device associated with the switch, but there is no other information than its MAC address, MAC3. However, the peripheral device nevertheless can be shown in the topological view 700, thereby allowing at least its remote monitoring. Searching for a faulty device on site is much easier, when it is at least known to which switch it is connected to. This in turn helps to minimize the time needed for maintenance, and the time the elevator cannot be used. Naturally, if there is floor information available on the view, the task to find the faulty device is even easier. Further, the device A is shown on the floor 3 in the topological view. This view, showing the devices regardless of a subnetwork they belong to, or regardless of the network management message protocol of the device, creates one integrated view for network monitoring. Further, it allows remote controlling, configuring and other manipulation of devices in an elevator signalling network, at least of those devices using the first protocol, or having a converter between the device management equipment and the device.

As can be seen from the above, there are no restrictions on what the first protocol and the second protocol are, and yet, thanks to the converters, an integrated device management is achieved. This in turn makes it possible to create scalable, proprietary transparent, hybrid elevator environments whose remote management sees the environment as a non-hybrid.

The steps, messages and related functions described above in FIGS. 2 to 7 are in no absolute chronological order, and some of the steps may be performed simultaneously or in an order differing from the given one. Other functions can also be executed between the steps/points or within the steps/points. Some of the steps/points or part of the steps/points can also be left out or replaced by a corresponding step or part of the step.

The techniques described herein may be implemented by various means so that an apparatus implementing one or more functions/operations described above with an embodiment/example, for example by means of any of FIGS. 1 to 7 and any combination thereof, comprises not only prior art means, but also means for implementing the one or more functions/operations of a corresponding functionality described with an embodiment, for example by means of any of FIGS. 1 to 7 and any combination thereof, and it may comprise separate means for each separate function/operation, or means may be configured to perform two or more functions/operations. For example, one or more of the means and/or a converter and/or a topology creation unit, or any corresponding unit, for one or more functions/operations described above may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium(s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 8:
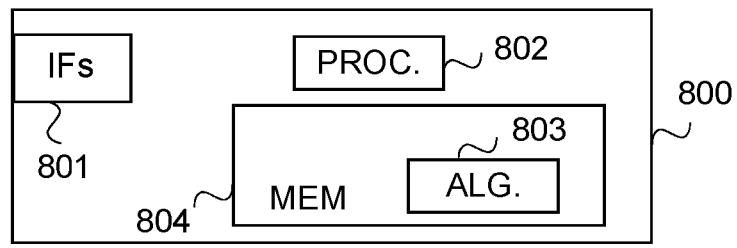
FIG. 8 is a schematic block diagram.

FIG. 8 is a simplified block diagram illustrating some units for an apparatus (device, equipment) 800 comprising a converter and/or the topology creation unit, or any corresponding unit or sub-units, or configured otherwise to perform at least some functionality described above, for example by means of any of FIGS. 1 to 7 and any combination thereof, or some of the functionalities if functionalities are distributed in the future. In the illustrated example, the apparatus comprises one or more interface (IF) entities 801, such as one or more user interfaces, one or more processing entities 802 connected to various interface entities 801 and to one or more memories 804.

The one or more interface entities 801 are entities for receiving and transmitting information, such as communication interfaces comprising hardware and/or software for realizing communication connectivity according to one or more communication protocols, or for realizing data storing and fetching, or for providing user interaction via one or more user interfaces. The one or more user interfaces may be any kind of a user interface, for example a screen, a keypad, or an integrated display device or external display device.

A processing entity 802 is capable to perform calculations and configured to implement at least a converter and/or the topology creation unit, or any corresponding unit or sub-units, described herein, or at least part of functionalities/operations described above, for example by means of any of FIGS. 1 to 7 and any combination thereof, with corresponding algorithms 803 stored in the memory 804. The entity 802 may include a processor, controller, control unit, microcontroller, unit, module, etc. suitable for carrying out embodiments or operations described above, for example by means of any of FIGS. 1 to 7 and any combination thereof. Generally the processor is a central processing unit, but the processor may be an additional operation processor.

A memory 804 is usable for storing a computer program code required for the converter and/or the topology creation unit, or any corresponding unit or sub-units, or for one or more functionalities/operations described above, for example by means of any of FIGS. 1 to 7 and any combination thereof, i.e. the algorithms for implementing the functionality/operations described above by means of any of FIGS. 1 to 7 and any combination thereof. The memory 804 may also be usable for storing other possible information, like the device information.

As a summary, each or some or one of the converter(s), units/sub-units and/or algorithms for functions/operations described herein, for example by means of means of any of FIGS. 1 to 7 and any combination thereof, may be configured as a computer or a processor, or a microprocessor, such as a single-chip computer element, or as a chipset, or one or more logic gates including at least a memory for providing storage area used for arithmetic operation and an operation processor for executing the arithmetic operation. Each or some or one of the units/sub-units and/or algorithms for functions/operations described above, for example by means of means of any of FIGS. 1 to 7 and any combination thereof, may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed and/or will be programmed by downloading computer program code (one or more algorithms) in such a way to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus (device, equipment), constitute a converter and/or the topology creation unit, or any corresponding unit, or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the converters/units and/or the algorithms for one or more functions/operations described above, for example by means of any of FIGS. 1 to 7 and any combination thereof, may be an element that comprises one or more arithmetic logic units, a number of special registers and control circuits.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An elevator system for a hybrid elevator network, the system comprising:
one or more devices forming a first subnetwork of the hybrid elevator network;
a data storage comprising, as network information, pre-set information on the one or more devices forming the first subnetwork;
device management equipment for elevator device management, the device management equipment being configured to use for device management messages at least one or more first protocols and to update and retrieve information from the data storage;
one or more second subnetworks of the hybrid elevator network, a second subnetwork comprising one or more peripheral devices, a peripheral device in a second subnetwork being configured to use a second protocol for device management messages; and at least one converter for converting device management messages according to the second protocol to be according to a first protocol before the device management messages reach the device management equipment, wherein the device management equipment is configured to update, in response to receiving a device management message containing, as device information, at least an identifier of a peripheral device, the network information in the data storage to contain the device information in the device management message.

2. The elevator system according to claim 1, wherein at least one of the one or more second subnetworks comprises one or more switches, a switch having a connection to the device management equipment and to which switch peripheral devices are connectable, wherein the switch is configured to send, in response to a peripheral device connecting to the switch or disconnecting from the switch, a device management message according to one of the one or more first protocols, the device management message comprising, as device information, identifiers of each peripheral device connected to the switch.

3. The elevator system according to claim 2, wherein the one of the one or more first protocols is the Simple Network Management Protocol.

4. The elevator system according to claim 3, wherein a peripheral device is configured to register itself to the device management equipment by sending, as device information, at least its identifier in a device management message created according to the second protocol.

5. The elevator system according to claim 2, wherein a peripheral device is configured to register itself to the device management equipment by sending, as device information, at least its identifier in a device management message created according to the second protocol.

6. The elevator system according to claim 1, wherein a peripheral device is configured to register itself to the device management equipment by sending, as device information, at least its identifier in a device management message created according to the second protocol.

7. The elevator system according to claim 6, wherein the peripheral device further comprises the converter and is configured to convert the device management message to be in accordance with at least one of the one or more first protocols before sending the device management message.

8. The elevator system according to claim 7, wherein the at least one of the one or more first protocols includes the Simple Network Management Protocol, the Message Queuing Telemetry Transport protocol, the Hypertext Transfer Protocol and/or the Hypertext Transfer Protocol Secure.

9. The elevator system according to claim 6, wherein the converter is a network entity between the network management equipment and the peripheral device and is configured to convert the device management message to be in accordance with at least one of the one or more first protocols.

10. The elevator system according to claim 1, wherein the peripheral device is a multipurpose display or a destination operation panel.

11. The elevator system according to claim 1, wherein the second protocol is a device-specific protocol.

12. The elevator system according to claim 1, wherein the device management equipment is configured to use the network information in the data storage to form one or more topology views illustrating at least part of the elevator network, which part include at least part of the one or more second subnetworks, created using at least identifiers of peripheral devices, and wherein the elevator system further comprises one or more user interfaces to display the one or more topology views.

13. The elevator system according to claim 1, wherein the identifier is a medium access control address of the peripheral device or an IP address of the peripheral device.

14. The elevator system according to claim 1,
wherein the device management equipment is further configured to create device management messages according to the first protocol to be transmitted to one or more target devices in a second subnetwork, and
wherein the at least one converter is configured to convert a management message according to the first protocol to be according to a second protocol used by a target device.

15. The elevator system according to claim 1, wherein the converter is a device management agent dedicated for the peripheral device or a device management agent dedicated for a second subnetwork or a device management agent for the one or more second subnetworks.

16. A method for a hybrid elevator network, the method comprising:
maintaining in a data storage, as network information, pre-set information on one or more devices in the hybrid elevator network;
using, by elevator device management, for device management messages at least one or more first protocols;
using, by one or more peripheral devices in the hybrid network, one or more second protocols for device management messages;
converting device management messages according to the second protocol to be according to a first protocol before the device management messages reach the elevator device management; and
updating, in response to receiving a device management message containing, as device information, at least an identifier of a peripheral device, the network information to contain the device information in the device management message.

17. The method according to claim 16, the method further comprising:
creating, by a switch in the hybrid elevator network, in response to a peripheral device connecting to the switch or disconnecting from the switch, a device management message according to one of the one or more first protocols, the device management message comprising, as device information, identifiers of each peripheral device connected to the switch; and
sending the device management message to the elevator device management.

18. The method according to claim 16, the method further comprising:
creating, by a peripheral device, a device management message according to the second protocol, the device management message comprising, as device information, an identifier of the peripheral device; and
sending the device management message towards the elevator device management.

19. The method according to claim 16, the method further comprising:
creating, by the elevator device management, based on at least identifiers of peripheral devices in the network information in the data storage, one or more topology views illustrating at least part of the elevator network, which part includes at least one peripheral device; and
displaying the one or more topology views.

20. The method according to claim 16, the method further comprising:
    creating, by the elevator device management, device management messages according to the first protocol to be transmitted to one or more target peripheral devices; and
    converting each management message according to the first protocol to be according to a second protocol used by one or more target peripheral device.

\* \* \* \* \*